United States Patent [19]
Ishikawa

[11] Patent Number: 5,930,192
[45] Date of Patent: Jul. 27, 1999

[54] MEMORY BACKUP CIRCUIT AND MEMORY BACKUP METHOD

[75] Inventor: Yuji Ishikawa, Yokohama, Japan

[73] Assignee: Canon Kabushiki Kaisha, Tokyo, Japan

[21] Appl. No.: 08/965,375

[22] Filed: Nov. 6, 1997

Related U.S. Application Data

[62] Division of application No. 08/523,627, Sep. 5, 1995, Pat. No. 5,719,816.

[30] Foreign Application Priority Data

Sep. 5, 1994 [JP] Japan .................................. 6-211162
Aug. 17, 1995 [JP] Japan .................................. 7-209467

[51] Int. Cl.⁶ .............................. G11C 7/00; G06F 11/18
[52] U.S. Cl. ..................... 365/229; 365/226; 365/227; 365/228
[58] Field of Search ................... 365/229, 226, 365/227, 228

[56] References Cited

U.S. PATENT DOCUMENTS

| | | | |
|---|---|---|---|
| 5,157,634 | 10/1992 | Dhong et al. | 365/222 |
| 5,186,206 | 2/1993 | Jones | 320/31 |
| 5,251,179 | 10/1993 | Wittman | 365/227 |
| 5,315,549 | 5/1994 | Scherpenberg et al. | 365/189.09 |
| 5,781,780 | 7/1998 | Walsh et al. | 395/750.1 |

*Primary Examiner*—Viet Q. Nguyen
*Attorney, Agent, or Firm*—Fitzpatrick, Cella, Harper & Scinto

[57] ABSTRACT

A change over unit 12 is controlled to become conductive only when useful data is stored in a memory 15 for storing data to be processed. Therefore, when a main power supply is shut off, a memory backup function of a backup battery 13 is operated only when useful data is stored in the memory 15, thereby preventing unnecessary backup, which results in preventing the backup battery 13 from unnecessarily discharging and realizing a reliable memory backup.

14 Claims, 10 Drawing Sheets

F I G. 7A 
F I G. 7B 
F I G. 7C 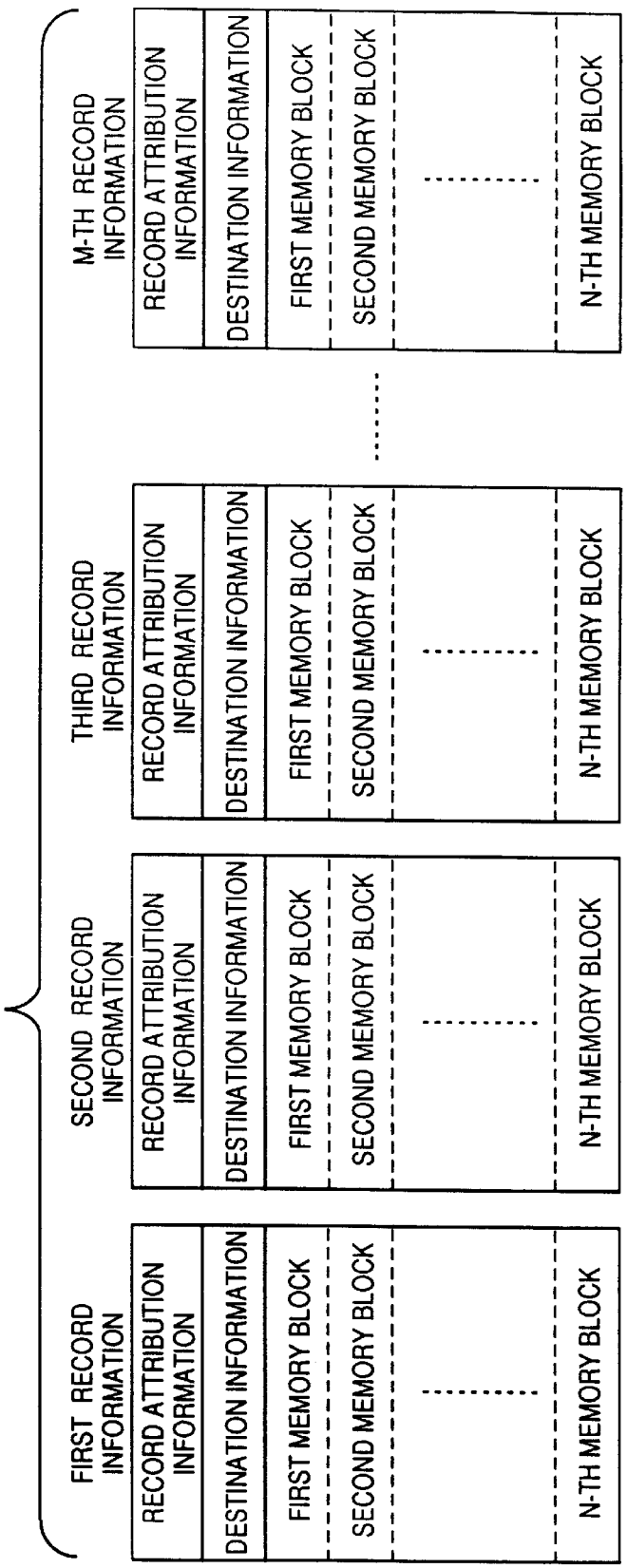

MEMORY BACKUP CIRCUIT AND MEMORY BACKUP METHOD

This application is a division of application Ser. No. 08/523,627 filed Sep. 5, 1995, now U.S. Pat. No. 5,719,816.

BACKGROUND OF THE INVENTION

The present invention relates to a memory backup circuit and a memory backup method and, more particularly, to a memory backup circuit and a memory backup method suitable for dynamic RAM (called "DRAM", hereinafter) used as an image memory in a facsimile apparatus and the like.

Generally DRAM is used as an image memory of a facsimile apparatus. Because of its construction, the DRAM has to be recursively rewritten with information to be stored in a predetermined time period, and this process is called "refresh", otherwise the contents in the DRAM will be lost.

The main purpose to use this conventional memory in a facsimile apparatus is to store an image to be send later or an image received while shortage of a printing paper.

As a printing unit of the facsimile is changed to a laser beam printer and an ink-jet printer which print images on paper sheets, a time gap between a receiving operation and a printing operation has arisen. Accordingly, the memory becomes often used as a temporary storage memory for storing image data for short time period since the image data is received until it is printed out.

As the purpose to use the DRAM has been changed as described above, DRAM having large capacity and consuming less electricity has been developed as well as it has become possible to backup with a relatively simple control (generally called as "self-refresh"), it has become possible to backup DRAM for a couple to several hours by using a normal size battery.

A conventional method for maintaining storage contents of a DRAM (memory backup) is to backup the entire DRAM, regardless of any condition, when the main power supply stops supplying power.

Generally, the battery used for backing up a DRAM is a secondary battery (rechargeable battery) since large current is necessary to back up the DRAM. Therefore, if the secondary battery discharges under any condition whenever the main power supply is turned off, as in the conventional case, there is no guarantee that the secondary battery will be charged enough when the main power supply is turned on. Accordingly, the secondary battery may not be charged enough in the event of a sudden electricity shut off, for which the secondary battery is originally provided in the facsimile apparatus.

SUMMARY OF THE INVENTION

The present invention has been made in consideration of the above situation, and has as its object to realize reliable memory backup by backing up a memory only when the memory contains useful data and when a main power supply is shut off so as to prevent unnecessary memory backup and to prevent a battery from being unnecessarily discharged.

It is especially advantageous to apply the above method to a facsimile apparatus for preventing the battery from being unnecessarily discharged since a case where useful data exists in the memory of the facsimile apparatus is limited.

According to the present invention, the foregoing object is attained by providing a memory backup circuit comprising: a memory for storing data to be processed; identifying means for identify whether or not useful data is stored in the memory; a backup battery which is charged while a main power supply is supplying current and discharges current when the main power supply ceases supplying current; power supply supervising means for changing selection from the main power supply and the backup battery as current supply source to the memory; and backup control means for selectively controlling whether or not to discharge current from the backup battery and for maintaining a state selected while the main power supply is supplying current after it ceases supplying current, wherein the backup control means sets the backup battery in a dischargeable state when the identifying means has determined that the memory has useful data, and sets the backup battery in a non-dischargeable state when the identifying means has determined that the memory has no useful data. Preferably, the memory includes a plurality of memory units, the identifying means identifies storage states of useful data in each of the memory units, and the backup control means controls current from the backup battery so as to selectively provide it only to a memory unit or units, storing the useful data, of the plurality of memory units. Further, the memory backup circuit as described above preferably further comprises useful data rearranging means for rearranging useful data stored in the plurality of memory units so as to be stored in a minimum possible number of memory units.

The foregoing object is also attained by providing a memory backup circuit comprising: a memory for storing data to be processed; identifying means for identify whether or not useful data is stored in the memory; a backup battery which is charged while a main power supply is supplying current and discharges current when the main power supply ceases supplying current; power supply supervising means for changing selection from the main power supply and the backup battery as current supply source to the memory; and backup control means for performing a self-refresh control sequence on the memory, wherein the backup control means executes the self-refresh control sequence only when the power supply supervising means detects a drop of an output voltage from a main power supply and when the identifying means has determined that the memory has useful data.

For example, the memory backup circuit as described above preferably further comprises useful data rearranging means for rearranging useful data stored in the plurality of memory units so as to be stored in a minimum possible number of memory units.

Further, the memory backup circuit as described above preferably further comprises useful data rearranging means for rearranging useful data stored in the plurality of memory units so as to be stored in a minimum possible number of memory units. Further, useful data stored in the memory is encoded data and the encoded data is communication data transmitted from another apparatus.

Furthermore, the encoded data, used in the aforesaid circuit and stored in the memory, is image data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 7A to 7C show examples of contents in a management memory shown in FIG. 6;

DETAILED DESCRIPTION OF THE PREFERRED EMBODIMENTS

Preferred embodiment of the present invention will be described in detail in accordance with the accompanying drawings.

First Embodiment

An operation according to the first embodiment is that a memory backup circuit is made functional only when the DRAM stores useful data and when a main power supply is shut off, thereby preventing unnecessary backup and thus keeping the secondary battery sufficiently charged as long as possible.

Accordingly, the memory backup circuit includes a discharge control means for controlling whether or not to discharge from the secondary battery to a DRAM by following a control program installed in an apparatus depending upon whether or not there is any useful data in the DRAM. The discharge control means is constructed so as to be able to function when the main power supply is turned off.

The apparatus having the above configuration operates as follow.

When useful data is to be written in a memory, the discharge control means sets the secondary battery so as to be able to discharge current in accordance with the control program installed in the apparatus. If the main power supply is shut off in this state, discharged current from the secondary battery is supplied to the DRAM storing the useful data, and the stored useful data is maintained. On the contrary, when no useful data is stored in the memory, the control program installed in the apparatus instructs the discharge control means to prohibit the secondary battery to discharge current. If the main power supply is shut off in this state, no discharged current is supplied by the secondary battery to the DRAM, and the consumed current from the secondary battery is kept the self-discharge level.

Figure 1:
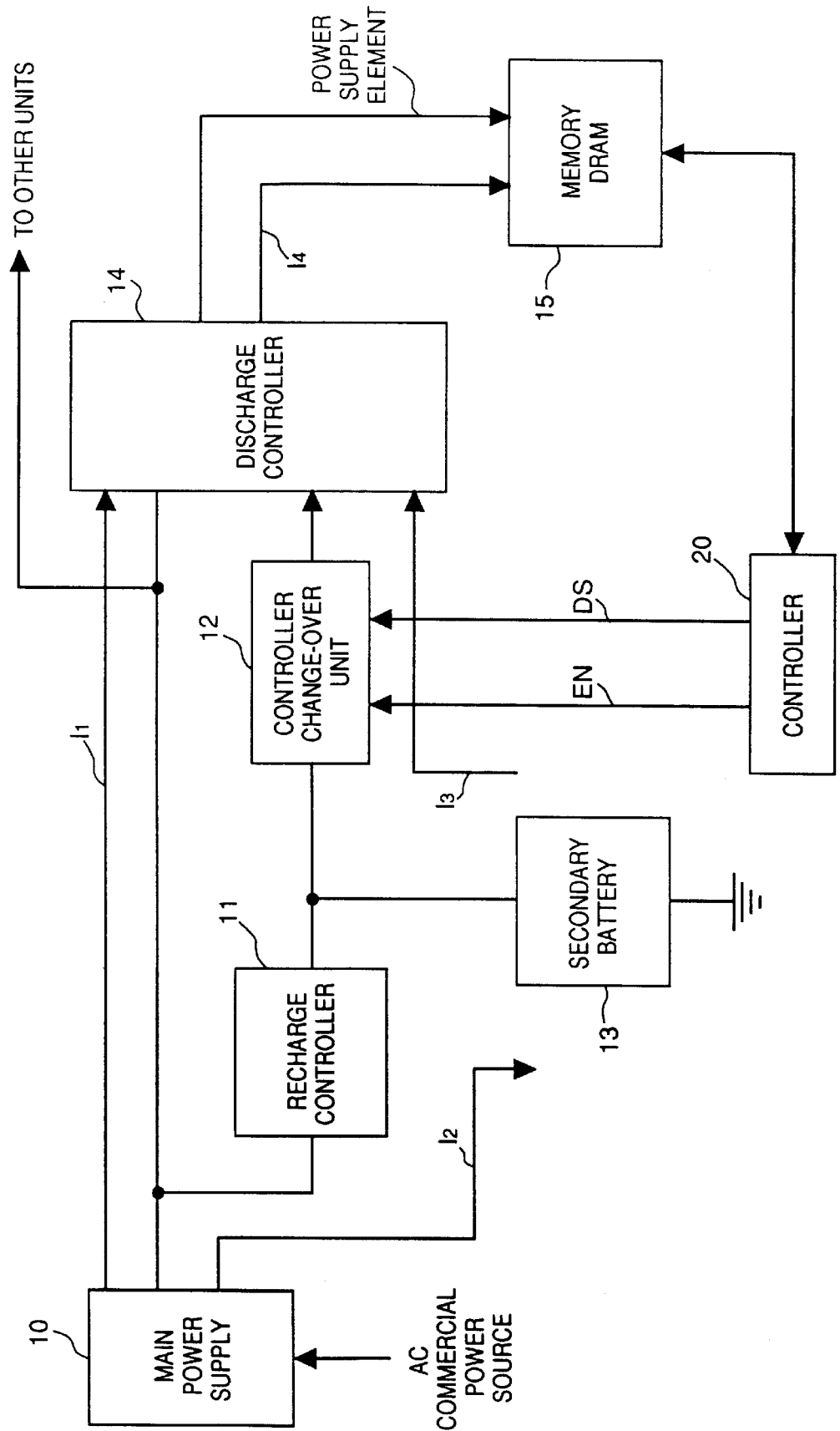
FIG. 1 is a block diagram showing a configuration of a memory backup circuit according to a first embodiment of the present invention.

Details of the aforesaid operation will be described below. FIG. 1 is a block diagram showing a configuration of a memory backup circuit according to a first embodiment of the present invention.

In FIG. 1, reference numeral 10 denotes a main power supply generating current, used to operate an entire apparatus including the memory backup circuit, with electricity supply from a general commercial electrical outlet (e.g., AC 100V); 11, recharge controller for controlling the current to charge a secondary battery 13 from the main power supply 10; and 12, a change-over unit for controlling whether or not a circuit in the secondary battery 13 side, a backup power source, is connected to discharge controller 14 in accordance with control signals EN and DS supplied by controller 20. The change-over unit 12 can be constructed with a latch-in relay or switching circuits which are electrical switch-over circuits using FET and the like. Reference numeral 13 denotes the rechargeable secondary battery as the backup power source for a memory 15; and 14, the discharge controller which selects the main power supply 10 to supply current to the memory 15 with normal driving current $I_1$ when the main power supply 10 is on in a normal state, and when it is off, selects to supply discharged current $I_3$ from the change-over unit 12 to the memory 15.

Further, the memory 15 is composed of DRAM and the like, for instance, and stores image data and the like. The controller 20 is responsible for access control of data to be stored in the memory 15 as well as performs change-over control of the change-over unit 12.

Note that the signal EN is a control signal which puts the change-over unit 12 in a closed state (low impedance state) and the signal DS is a control signal which puts the change-over unit 12 in an open state (high impedance state). The driving current $I_1$ is supplied by the main power supply 10 to the memory 15 and the like when the main power supply is on, charging current I2 is supplied by the main power supply 10 to the secondary battery 13 while the main power supply is on, the discharged current $I_3$ is discharged from the secondary battery 13, and source current $I_4$ is supplied to the memory 15.

In the aforesaid configuration, while the main power supply 10 is normally working after it is turned on, it supplies the source current $I_4$ to the memory 15, the charging current $I_2$ to the secondary battery 13, and driving current to other units of the first embodiment.

When the main power supply 10 stops working because a switch of the apparatus including the memory backup circuit of the first embodiment is turned off, if the change-over unit 12 is in the closed state at the time, the discharged current $I_3$ (backup current) is supplied by the secondary battery to the discharge controller 14 through the change-over unit 12, since the memory backup circuit is constructed so as to maintain current state of the memory 15. Then, the discharge controller 14 supplies the discharged current $I_3$ to the memory 15 as the source current $I_4$ instead of the driving current $I_1$ from the main power supply 10. Accordingly, the memory 15 is able to maintain storing contents even when the main power supply 10 is shut off.

Whereas, if the changeover unit 12 is open when the main power supply 10 stopped working, no current is discharged from the secondary battery 13, thus current supply to the memory 15 is stopped at the same time.

Figure 2:
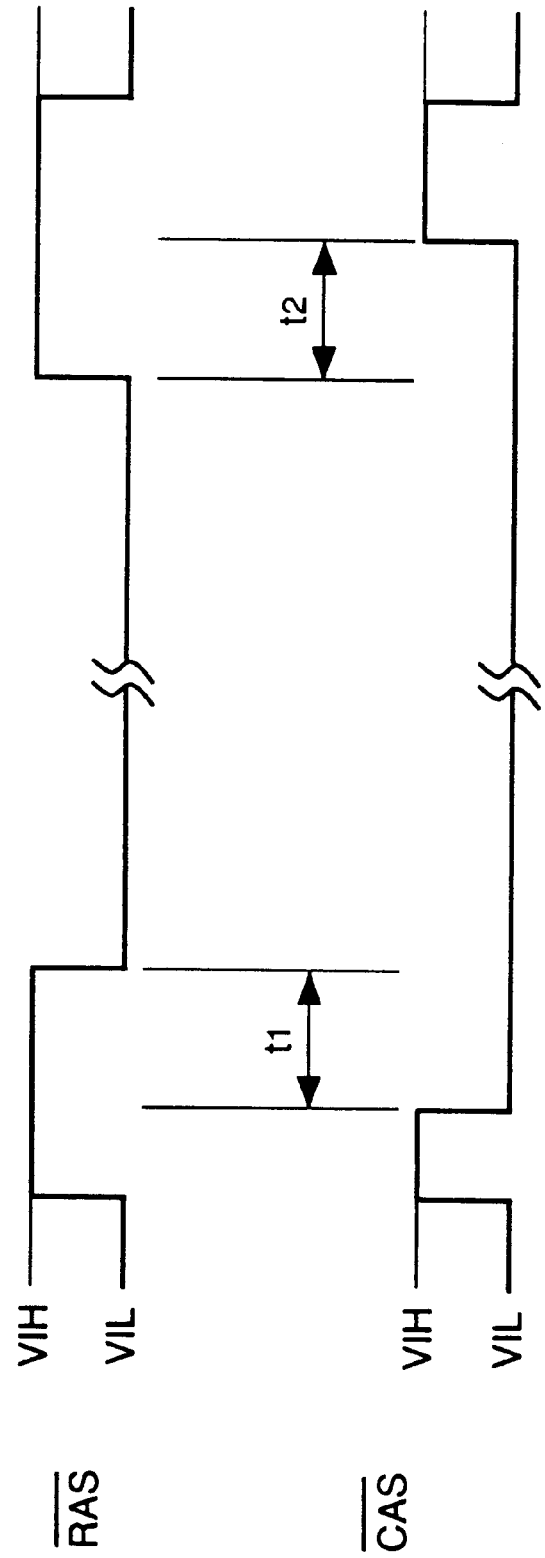
FIG. 2 is a timing chart for explaining a self-refresh sequence of a memory according to the first embodiment.

It should be noted that, in the aforesaid explanation, only a configuration of a power supply unit of the first embodiment is shown in FIG. 1, therefore control signals, such as RAS and CAS, which are necessary for the controller 20 to back up DRAM composing the memory 15 in the self-refresh mode are not shown in FIG. 1. However, it is necessary to control the RAS and CAS signals in a specific timing sequence as shown in FIG. 2. Time intervals t1 and t2 are altered depending on kinds of DRAMs and so on.

With a backup circuit having the aforesaid configuration, the memory write and read control will be explained below with reference to flowcharts in FIGS. 3 and 4.

Figure 3:
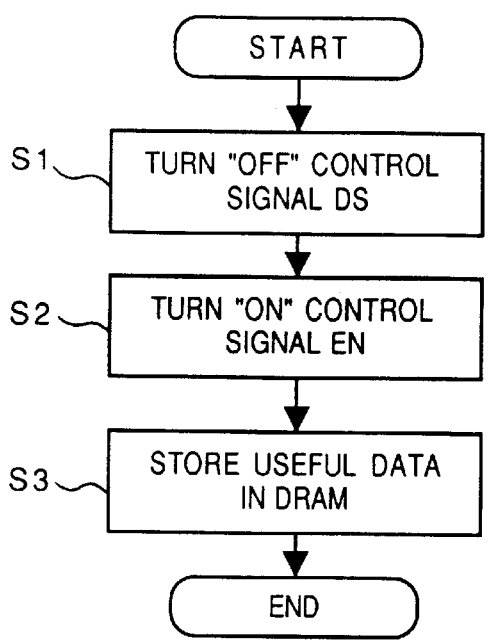
FIG. 3 is a flowchart showing data write access sequence to the memory according to the first embodiment.
Figure 4:
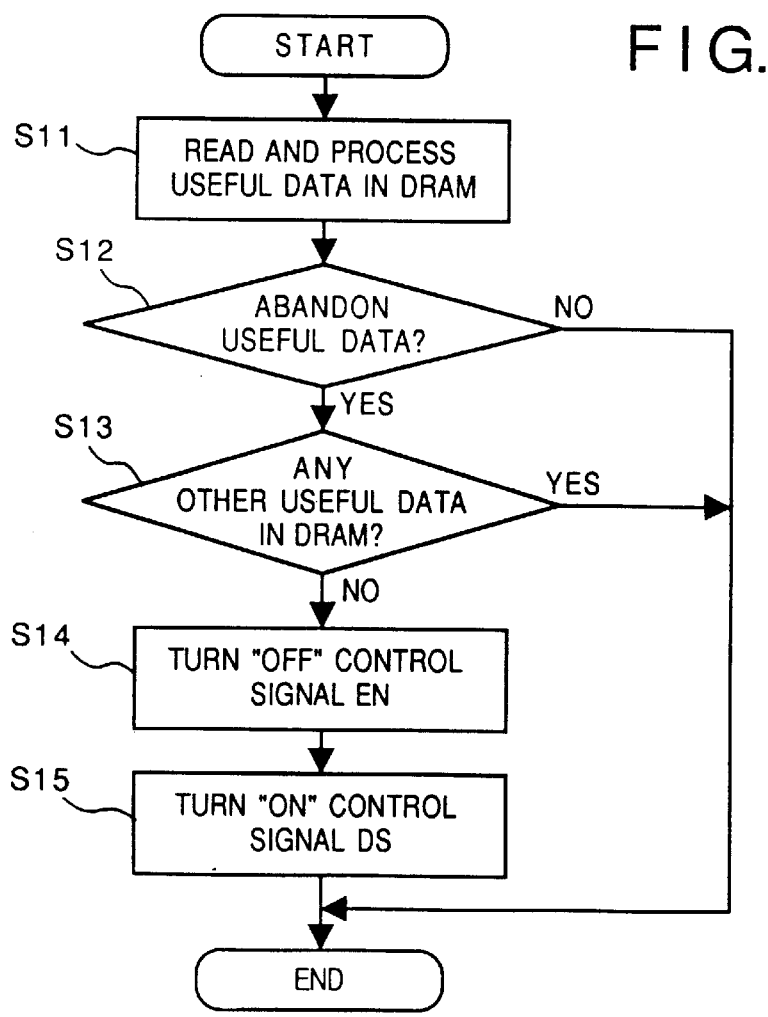
FIG. 4 is a flowchart showing data read & process access sequence to the memory according to the first embodiment.

First, referring to FIG. 3, an example for writing useful data in the memory 15 and controlling the memory to perform backup when current supply from the main power supply 10 is stopped.

First at step S1, the controller 20 turns "OFF" the control signal DS to the change-over unit 12 so that the change-over unit 12 can be controlled only in accordance with the state of the control signal EN. Next at step S2, the control signal EN is turned "ON" which puts the change-over unit 12 in the closed state. Then, the controller 20 writes the aimed useful data in the memory 15 at step S3.

When a latch-in relay is used in the change-over unit 12, once the state of its contact is set, namely either ON or OFF, the set state can be maintained even after driving current is stopped. Accordingly, it is possible to realize the aforesaid operation.

Therefore, if the main power supply 10 is shut off after the aforesaid operation, the discharged current $I_3$ is supplied by the secondary battery 13 to the memory 15, thereby the useful data stored in the memory 15 can be maintained.

Next, control operation of a case where contents stored in the memory 15 are abandoned (made ineffective) will be described. This control operation is for invalidating backup operation which is opposite to the above-described operation.

In this case, the controller 20 processes useful data remained in the memory 15 at step S11. Then at step S12, whether or not the processed data can be abandoned is determined. If it cannot be abandoned, the process is completed without performing any further operation. Examples of such a case is that only part of received data in a facsimile apparatus and the like has been printed out and that a transmission operation has not been completed normally in a facsimile apparatus which is controlled to keep contents, in its memory, when a transmission error occurred. In these cases, processes described below are not performed, and the memory 15 is backed up.

In contrast, in a case where the stored contents in the memory 15 can be abandoned, e.g., such as cases where received contents stored in the memory have been printed out and read original data or the like temporarily stored in the memory 15 has been transmitted to a designation apparatus, the process moves to step S13. Then, whether or not there is any useful data in the memory 15 other than the data which can be abandoned is determined. If there is useful data to be maintained, the process is completed.

Whereas, if it is determined that all the data stored in the memory 15 is useless data which can be abandoned at step S13, the process moves to step S14. At step S14, the controller 20 turns "OFF" the control signal EN to the change-over unit 12. Subsequently, at step S15, the control signal DS is turned "ON" which puts the change-over unit 12 in the open state, or the high-impedance state, so that the discharged current $I_3$ from the secondary battery 13 is not provided to the discharge controller 14.

According to the first embodiment as described above, the memory 15 is backed up by using the secondary battery 13 only when it has data to be maintained. Therefore, if there is no useful data in the memory 15, no current is supplied to the memory 15 by the secondary battery 13 which is the backup power source when the main power supply 10 is shut off, thereby reducing consumed electricity from the secondary battery. Accordingly, the secondary battery 13 will be sufficiently charged when the apparatus, including a backup circuit, is turned on the next time.

Further, the number of times of discharging current by the secondary battery 13 which is used to backup the memory 15 can be greatly reduced since the battery discharges current only when there is useful data in the memory 15. Therefore, the number of times to charge the secondary battery 13 is greatly reduced, which extends the life of the secondary battery 13.

Second Embodiment

Next, a configuration of a memory backup circuit according to a second embodiment will be described with reference to FIG. 5. In the second embodiment, selection of either execution or non-execution of the backup operation does not depend on whether or not current is supplied by the secondary battery, but on whether or not refresh operation of a memory is performed.

Figure 5:
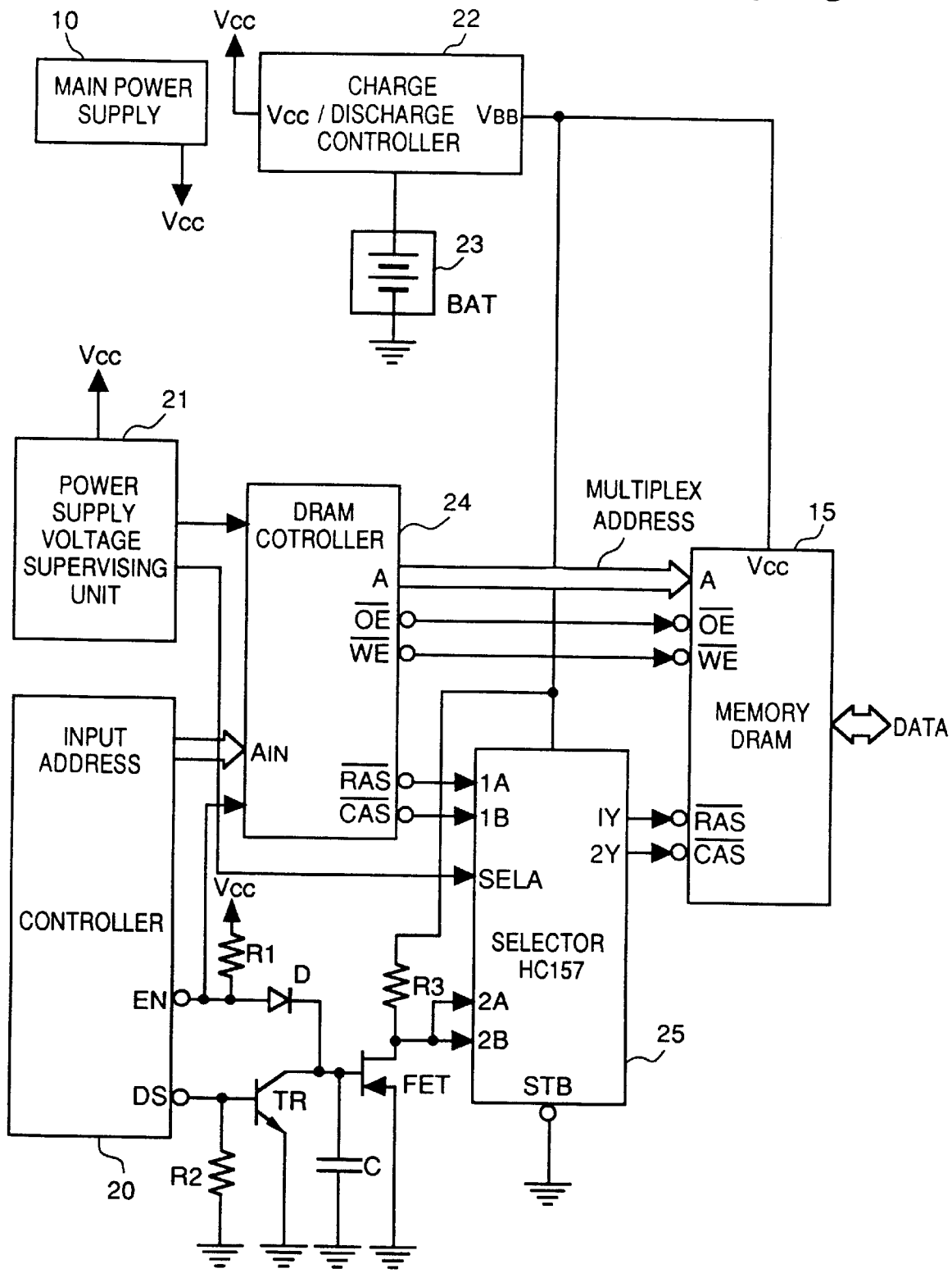
FIG. 5 is a block diagram showing a configuration of a memory backup circuit according to a second embodiment of the present invention.

In FIG. 5, reference numeral 21 denotes a power supply voltage supervising unit (referred as "supervising unit", hereinafter) for supervising a state of the main power supply 10; 22, charge/discharge controller for controlling a rechargeable secondary battery 23 to be charged or discharge, selecting either a voltage of the main power supply 10 or a voltage of the secondary battery 23 as a backup voltage $V_{BB}$ and outputting it; and 23, the secondary battery which is a power supply of the backup power to the memory 15.

Further, reference numeral 24 denotes DRAM controller for controlling RAS and CAS signals which are necessary to access the DRAM composing the memory 15, performing an address multiplexing process, and executing a self-refresh cycle shown in FIG. 2 when the memory 15 is to be backed up.

Reference numeral 25 denotes a selector, driven by the backup voltage as the memory 15, for selecting and outputting either the RAS/CAS signals outputted by the DRAM controller 24 or a backup signal from a circuit consisting of a diode D, a transistor TR, FET, condenser and the like. Note that the memory 15 is driven with the voltage $V_{BB}$ outputted from the charge/discharge controller 22 in the second embodiment.

As in the case of the first embodiment, the signal EN is a control signal which is in HIGH level when the memory 15 is to be backed up, and the signal DS is a control signal which is in HIGH level when the memory 15 is not to be backed up.

An operation of the memory backup circuit having the above-configuration will be described below.

When the main power supply 10 is supplying voltage, the RAS/CAS signals outputted from the DRAM controller 24 is supplied to DRAM composing the memory 15 via the selector 25, and memory access is permitted. Data write and read control to/from the memory 15 in the second embodiment is basically the same as the first embodiment explained with reference to FIGS. 3 and 4.

More specific operation will be explained below. By changing the control signal EN to HIGH by the controller 20, a condenser C charges to a high voltage, the FET becomes low impedance, and two inputs of 2A and 2B of the selector 25 become LOW. Further, the control signal EN is also inputted into the DRAM controller 24. This is because the DRAM controller 24 executes the self-refresh sequence by controlling the RAS/CAS signals as shown in FIG. 2 when a signal indicating that a voltage of the main power supply is falling is inputted from the power supply voltage supervising unit 21.

On the other hand, if the controller 20 makes the control signal DS HIGH, then the charge in the condenser C is discharged through the transistor TR, thereby the inputs 2A and 2B of the selector 25 become HIGH.

If there is any useful data in the memory 15, the signal EN is HIGH and the signal DS is LOW, controlled by the controller 20 as described above with reference to FIGS. 3 and 4. Under these conditions, if the supervising unit 21 detects the drop of the voltage of the main power supply 10, then the RAS/CAS signals outputted from the DRAM controller 24 are changed so as to execute the self-refresh, i.e., the CAS signal is changed to LOW first, then the RAS signal is changed to LOW by following the sequence shown in FIG. 2.

Next, the supervising unit 21 changes an output selection signal SELA of the selector 25, and the RAS/CAS signals to be provided to the memory 15 is switched from the ones outputted from the DRAM controller 24 to the ones generated by the FET of a discrete circuit. At this time, the condenser C is in high potential state, thus the both RAS/CAS signals to be provided to the memory 15 remain LOW.

The aforesaid states of RAS/CAS signals means the execution of the self-refresh process. Accordingly, the contents stored in the memory 15 is maintained.

The above process is performed when useful data exists in the memory 15. In contrast, when no useful data exists in the memory 15, an operation is as follow.

When useful data does not exist, the signal EN is LOW and the signal DS is HIGH, thus the condenser C is LOW and inputs 2A and 2B of the selector are HIGH. Under these conditions, if the supervising unit 21 detects the drop of a voltage of the main power supply 10, the supervising unit 21 informs the detected information to the DRAM controller 24. However, since the signal EN is LOW, the DRAM controller 24 does not execute the aforesaid self-refresh sequence and the RAS/CAS signals remain HIGH. Thereafter, the supervising unit 21 changes signals to be outputted from the selector 25 from a signal from the DRAM controller 24 to a signal from the FET. Since the both signals are HIGH, thus the memory 15 does not changes to a self-refresh mode and remains in a stand-by mode. Accordingly, consumed voltage is very small thus the consumed power of the secondary battery can be reduced.

According to the second embodiment as described above, in a case where the main power supply 10 ceases supplying power, the operational mode of the memory 15 during backup can be changed depending on the stored contents, thus preventing power of the secondary battery from being wasted, thereby preventing power shortage of the secondary battery during performing necessary backup.

Third Embodiment

According to the first and second embodiments as described above, if there is only one useful data in the memory 15, the entire memory 15 becomes subject to the backup operation. However, the present invention is not limited to this. In a case where the memory is constructed with a plurality of memory chips, it is possible to backup parts which store useful data selectively and independently by providing discharge controller, described in the above embodiment, in each part of the memory 15 (e.g., in each memory chip).

More specifically, if each part of the memory is a memory chip, discharge controller is provided in each of the memory part independently. Then, whether or not there is useful data is determined for each memory part (i.e., memory parts storing useful data are determined), and current is provided only to the memory parts (memory chips) storing useful data are controlled to perform backup operation.

Therefore, if the operational control of the first embodiment is employed, the change-over unit 12 and discharge controller 14, shown in FIG. 1, are provided in each part of the memory (e.g., each memory chip), and the controller 20 controls so as to supply current only to memory parts which store useful data, and not to supply current to memory parts (memory chips) which do not store useful data. The third embodiment can be applied to the second embodiment in the similar manner to the first embodiment.

Generally, it is very rare that useful data is stored in the entire memory. Therefore, by baking up memory parts selectively, it is possible to reduce consumed electricity, thereby the memory can be backed up for a longer time with a battery of the same capacity as one used in the first and second embodiments.

According to the third embodiment as described above, whether or not there is useful data is determined by each part of the memory, and only necessary part or parts of the memory are backed up. Therefore, if the memory is composed of a plurality of DRAM chips, by baking up only DRAM chips which have stored useful data, it is possible to keep the stored data for a longer time by using a battery of fixed capacity.

Fourth Embodiment

In the aforesaid third embodiment, memory chips are selectively backed up. If data is stored so as not to unnecessarily extend to a plurality of memory chips, more effective backup control can be realized. However, in a case where a plurality of image data is stored, the data is not always stored in memory areas having successive addresses.

Therefore, in the fourth embodiment, in a case where useful data stored in the memory is deleted, the memory area which has been used to store the deleted useful data, each of memory areas capable of storing useful data, and how each memory chip includes the memory areas are taken into consideration, then useful data is rearranged and stored so that it is stored in the minimum number of memory chips.

For example, when a memory area is partially emptied, entire amount of useful data in the memory is checked. Then, in how many memory chips the entire useful data can be stored is determined, and the determined number of the memory chips and the number of memory chips which are currently storing any useful data are compared. If they are same, then the backup process is applied to only the memory chips which are currently storing the useful data.

Whereas, if the determined number of the memory chips and the number of memory chips currently storing useful data are different, then memory areas to store the useful data are changed so that the useful data can be stored in the memory areas having successive addresses, for instance, thereby reducing the number of the memory chips to store useful data to the minimum number. Then, the backup process is set to be applied to those memory chips currently storing the useful data.

According to the fourth embodiment as described above, it is possible to minimize the number of memory chips to be used for storing useful data, thereby reducing current to be consumed from backup power source.

Fifth Embodiment

Figure 6:
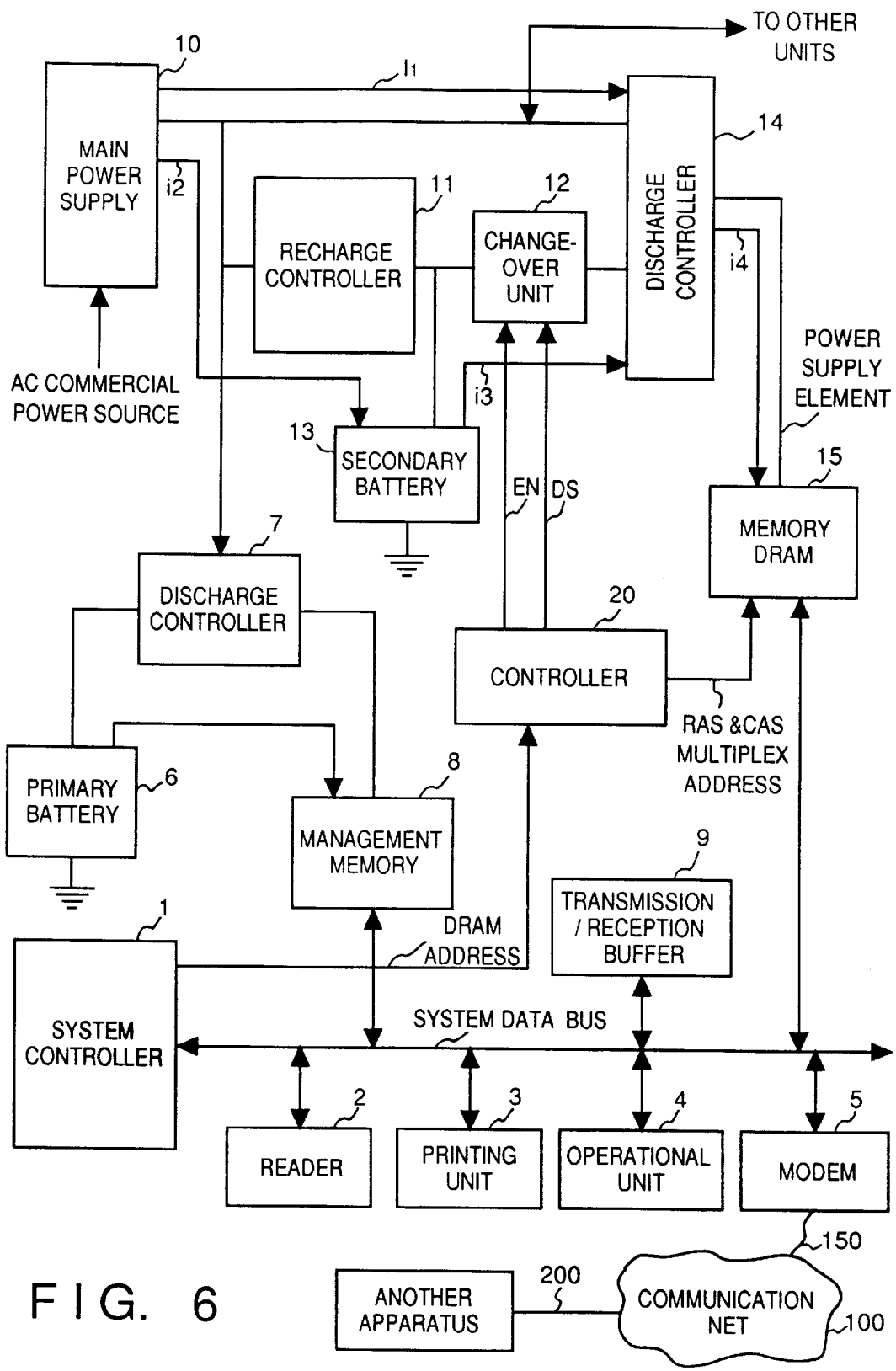
FIG. 6 is a block diagram showing a configuration of a facsimile apparatus including a memory backup circuit according to a fifth embodiment of the present invention.

FIG. 6 is a block diagram showing a configuration of a facsimile apparatus including a memory backup circuit according to a fifth embodiment of the present invention. In the fifth embodiment, a memory backup circuit is included in a facsimile apparatus as an example. The configuration shown in FIG. 6 according to the fifth embodiment includes the configuration shown in FIG. 1 according to the first embodiment and is added with elements which are specific to a facsimile apparatus. In FIG. 6, the same unit and elements as those in FIG. 1 are referred by the same reference numerals and explanations of those are omitted.

In FIG. 6, reference numeral 1 denotes system controller which controls overall operation of the facsimile apparatus having the memory backup circuit, and reference numeral 2 denotes a reader, having document feeder, for reading an original document for sending via facsimile or copying and for outputting binary image data. The binary image data of the read document from the reader 2 is converted into compressed coded data by a compression function provided in the system controller 1, and the coded data is stored in an empty area or areas in the memory 15. In which area or areas or in which order the coded data is stored in the memory 15 is registered in a management memory 8 by the system controller, and managed.

Further, reference numeral 3 denotes a printing unit for printing an image. The printing operation by the printing unit 3 is controlled by the system controller 1. More specifically, the coded image data to be printed stored in the memory 15 is decoded by a decoding function for the compressed coded data installed in the system controller 1 and converted into pixel data, then the pixel data is printed out in the printing unit 3.

Reference numeral 4 denotes an operating unit having input means for input ing instruction of operation to the facsimile apparatus and display means for displaying operational situation, and reference numeral 5 denotes MODEM, connected to a communication network, for communicating via facsimile by modulating and demodulating image data.

Reference numeral 6 denotes a primary battery for supplying current to the management memory 8 so that the management memory 8 can keep stored data when the main power supply is shut off. With the current supply discharged from the primary battery 6, the management memory 8 can serve as a nor-volatile memory. Further, reference numeral 7 denotes discharge controller for supervising a voltage of the main power supply 10 and changing power sources which supply currents to the management memory 8 so as to supply current from the main power supply 10 while it is working, and from the primary battery 6 when the main power supply 10 is shut off.

Reference numeral 8 denotes the management memory having a memory block management table and a record management table. In the fifth embodiment, the memory 15 is defined as a group of memory block of a fixed capacity, and the memory block management table of the management memory 8 is for managing situation of use of each memory block. Further, in the fifth embodiment, amount of coded image data which can be stored in the memory 15 in a single process is defined as "1 record", and attribution information, destination information, and arrangement information of occupied memory blocks of M records are stored in the management memory 8. Details of these information will be described later.

Reference numeral 9 denotes a transmission/reception buffer memory for temporary storing received data and data to be transmitted from/to other facsimile apparatus via the MODEM 5 in a MODEM interruption process during transmitting or receiving facsimile, and reference numeral 10 denotes the main power supply which is inputted with an AC commercial power source for supplying driving current $I_1$ to the facsimile apparatus.

Further, reference numeral 100 denotes a communication net to which the facsimile apparatus of the fifth embodiment is connected; 150, a connection line for connecting the facsimile apparatus to the communication net 100; and 200, other apparatus capable of communicate via facsimile connected to the communication net 100.

FIGS. 7A to 7C show examples of contents in the management memory 8 shown in FIG. 6. The management memory 8, as described above, can be backed up for a long time with current supplied by the primary battery 6, thus it can be considered as a non-volatile memory.

(1) Configuration of the Memory Block Management Table (FIG. 7A)

The memory 15 is managed as N memory blocks of fixed capacity each. The management table is for managing state of use of each of the memory blocks, and identifies memory blocks storing useful data from empty memory blocks.

In order to store image data in the memory 15, the management table is searched and a status of an empty memory block is changed to a used status, then desired data is stored in the empty memory block, for example.

In contrast, in order to delete image data from the memory 15, management data corresponding to a memory block storing the image data to be deleted is changed to an empty status.

By controlling as above, it is possible to easily know the state of use of the memory 15 only by checking this management table.

(2) Configuration of the Record Management Table (FIG. 7B)

In the fifth embodiment, amount of coded image data which can be stored in the memory 15 in a single process, such as memory transmission, copying memory, and receiving data, is defined as "1 record", and managed as a record.

The record management table has memory capacity capable of managing M records, and manages whether or not each management data registered in the record management table is active.

In a case where image data is stored in the memory 15, the management table is searched and an empty record information area is found. Then, the image data to be stored in the memory 15 is written in the found empty record information area.

On the contrary, in a case where image data stored in the memory 15 is to be deleted, managing data in the record management table corresponding to the record of image data to be deleted is changed to show that it is empty.

(3) Structure of Record Information (FIG. 7C)

There are first to M-th record information as shown in FIG. 7C each of which corresponds to each of the M records managed in the record management table shown in FIG. 7B.

Each record information has following information.

Record Attribute Information: Indicates whether each record of the image data stored in the memory is for facsimile transmission, for memory copy, or received data via facsimile. It also includes a flag showing whether or not backup is to be performed.

Destination Information: Stores destination information when the stored image data is for facsimile transmission.

First Memory Block~N-th Memory Block: Stores an order of memory block numbers where image data is stored in the memory 15.

Further, information on a top memory block and resolution of each page is also stored.

A backup control in each operation of the facsimile apparatus having the aforesaid configuration according to the fifth embodiment will be described below.

First, transmission operation of image data, stored in the memory 15, of a read document will be explained. Outline of this operation is that all image data obtained by reading a document is stored in the memory 15, thereafter, the predetermined destination apparatus (e.g., the apparatus 200) is automatically called, and the image data stored in the memory 15 is read and transmitted.

Figure 8:
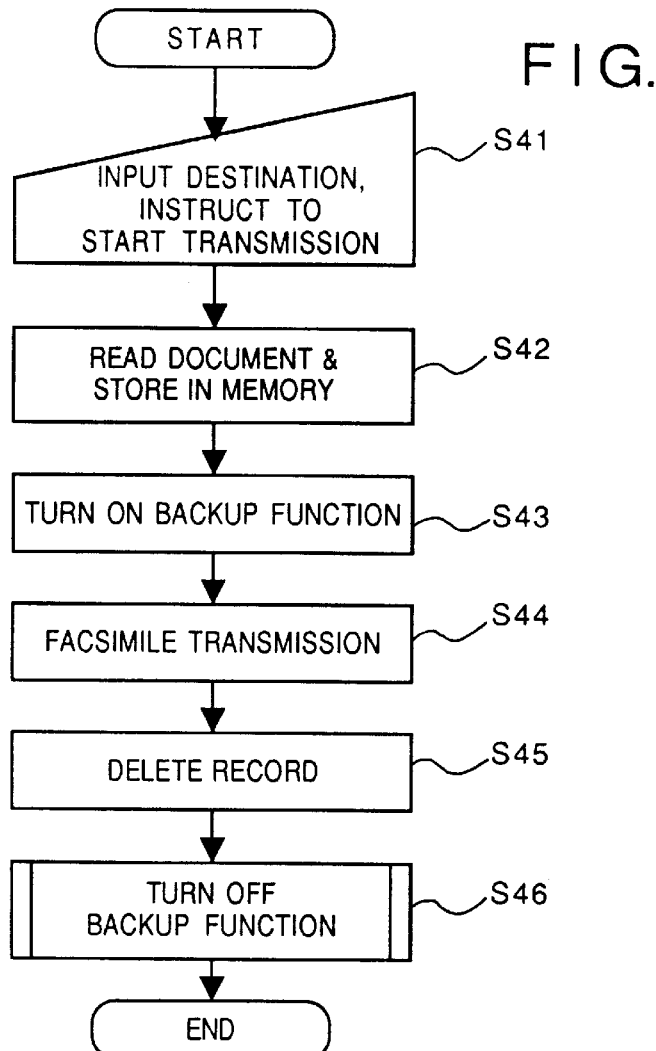
FIG. 8 is a flowchart of a memory transmission operation in the facsimile apparatus according to the fifth embodiment.

FIG. 8 is a flowchart showing the control operation of the transmission operation. The memory transmission operation is described below with reference to FIG. 8.

First at step S41, an operator sets a document to be transmitted at the reader 2, and from the operational unit 4, inputs destination information specifying an apparatus, capable of facsimile communication and connected to the communication line 100, to which image data of the document is to be sent. Then, the operator inputs an instruction to start transmitting image data from the memory 15. A facsimile apparatus capable of inputting a single destination as well as a plurality of destination can be used in this embodiment. In the fifth embodiment, the facsimile apparatus can designate a plurality of destinations sequentially. When the destinations are inputted, the system controller 1 searches the record management table in the management memory 8 so as to find an Empty record information area. Further, it also searches the memory block management table and obtains an available memory block. Then the obtained memory block number is written in the found record information area.

The controller 20 subsequently performs a read process of the document to be sent by the reader 2 at step S42. Then, the system controller 1 performs known coding and compression processes on the read image data (e.g., binary data), and the coded data is sequentially stored in the memory 15. If the obtained memory block becomes full in the middle of storing the coded data in the memory 15, the memory block management table in the management memory 8 is searched again so as to find new empty memory block, then the number of the memory block is additionally written in the record information area.

As described above, when read process of all the documents placed in the reader 2 and storing process of coded image data in the memory 15 are completed, the process moves to step S43, where the backup function of the memory 15 is turned ON. At the same time, a flag indicating to perform backup in the record attribute information is set.

Then at step S44, the facsimile apparatus automatically calls the destination designated at the previous step S41. The image data stored in the memory 15 is read and stored in a transmission buffer area of the transmission/reception buffer 9, modulated by the MODEM 5, then sent to the destination apparatus specified by the destination information via facsimile. Note that, in a case where a plurality of destinations are designated, the image data is sent to the designated destinations in turn via facsimile, until the image data stored in the memory is sent to all the designated destinations.

After facsimile transmission to all the designated destinations is completed, at subsequent step S45, management data corresponding to the used memory block in the memory block management table is freed and management data corresponding to the used record information area in the record management table is changed to show empty. Thereby, the memory block, storing the data sent via facsimile, of the memory 15 can be freely used in other processes.

Accordingly, at subsequent step S46, a subroutine to turn the backup function of the memory 15 OFF is executed, and a flag in the record attribution information indicating to perform backup is reset. Then he process is completed.

Figure 9:
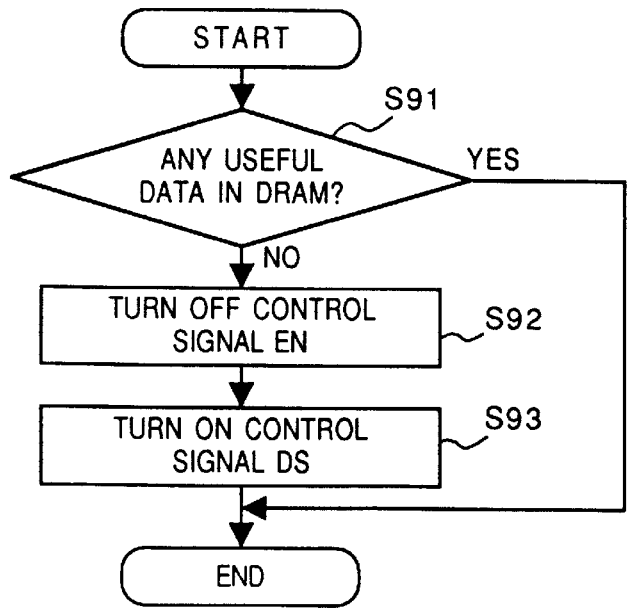
FIG. 9 is a flowchart showing details of a subroutine for turning off a backup function shown at step S46 in FIG. 8.

A detailed flowchart of the subroutine for turning OFF the backup function executed at step S46 is shown in FIG. 9.

First at step S91, it is determined whether or not any image data necessary to be backed up is stored in the memory 15 by referring to the record management table and valid record information. If there is any other image to be backed up, this process is completed without performing any other operation.

Whereas, if it is determined at step S91 that there is no image data which is to be backed up in the memory 15, the process proceeds to step S92. At step S92, the EN signal used for turning ON the backup function is invalidated.

Next at step S93, the DS signal used for turning OFF the backup function is validated. Thereby, the change-over unit 12 is made high impedance so that the discharged current i3 from the secondary battery 13 is not supplied to the discharge controller 14 when the main power supply 10 is shut off. Then, this process is completed.

Next, the receiving operation in the facsimile apparatus of the fifth embodiment will be explained.

The facsimile apparatus of the fifth embodiment stores received image data in the memory 15 in the receiving process.

Printing processing task which is performed in parallel with the receiving process always searches each record information in the management memory 8 to check whether or not there is any data to be printed out. As for received image data in the receiving process, for example, when a page of the received image data is stored in the management memory 8, printing process is started to print out the image data.

Figure 10:
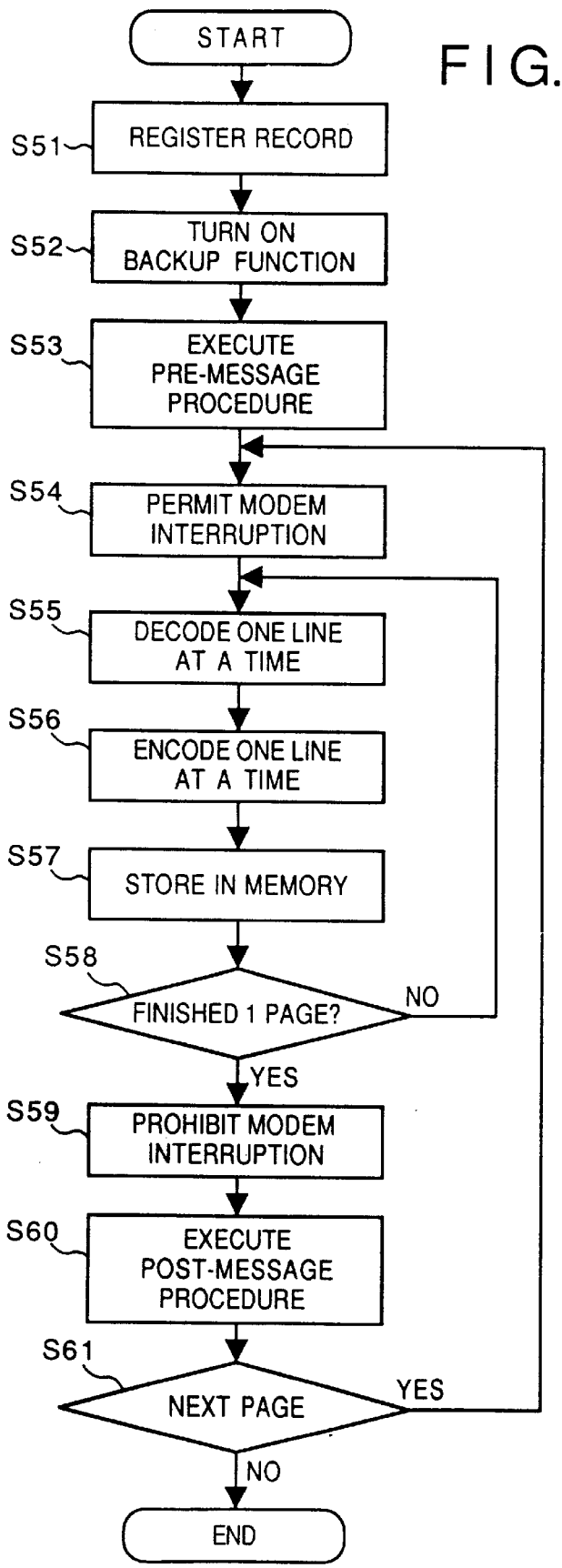
FIG. 10 is a flowchart showing a main process of receiving operation in the facsimile apparatus according to the fifth embodiment.
Figure 11:
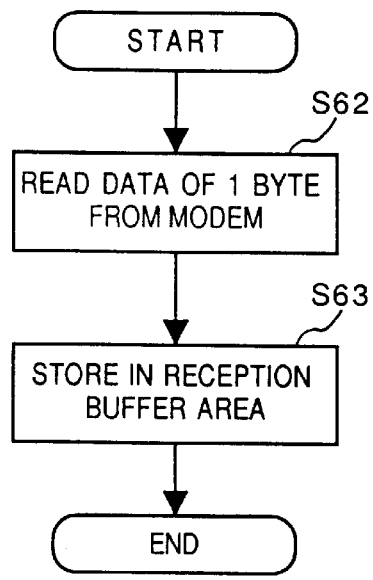
FIG. 11 is a flowchart showing a MODEM interruption process during the receiving operation in the facsimile apparatus according to the fifth embodiment.

FIG. 10 is a flowchart showing the receiving process in the fifth embodiment, and FIG. 11 is a flowchart showing an interruption process to forward received coded data from the MODEM 5 to the transmission/reception buffer 9.

Regarding the printing process following the receiving process, it is the same as a memory copy process which will be described later, thus the explanation of the printing process is omitted here.

When the apparatus detects a call from another apparatus, e.g., the apparatus 200, in the communication net 100 through the connection line 150, the system controller 1 searches the record management table in the management memory 8, and obtains an available empty record information area. At the same time, it also searches the memory block management table and obtains an available memory block. Then the obtained memory block number is written in the searched record information area.

Then at step S52, the backup function of the memory 15 is turned on. By turning on the backup function at this point, when the main power supply 10 is suddenly shut off while receiving data, it is possible to maintain the image data which has been received by that time. Further, a flag indicating to perform backup in the record attribution information is set.

Then at step S53, a pre-massage procedure of the transmission control sequence in the receiving process via facsimile is performed by controlling the MODEM 5. Next at step S54, in order to successively receive sent image data, the apparatus is set so as to be ready for a MODEM interruption routine shown in FIG. 11. Thereby, the image data which is received and demodulated thereafter by the MODEM 5 is stored in the reception buffer area of the transmission/reception buffer 9 sequentially in the operational sequence which will be described later.

Therefore, the system controller 1 decodes the received data stored in the transmission/reception buffer 9 one line at a time at step S55, and checks whether or not there is any error in the received data. Then at step S56, the system controller 1 encodes the received data of one line which is decoded at the previous step S55.

Next, the image data encoded at step S56 is stored in the memory 15 at step S57. When a memory block which is used at this time becomes full, then the memory block control table of the management memory 8 is searched, an available memory block is found, and the number of the memory block in which the image data is to be stored next is written in the record information area assigned for this receiving operation.

Subsequently, at step S58, whether or not one page of image information which is decoded in the decoding process at step S55 has been received is determined. If it has not, the process returns to step S55.

Whereas, if it is determined that one page of image information has been received, then the process proceeds to step S59. Then at step S59, the MODEM interruption process permitted at the previous step S54 is prohibited. At step S60, post-massage procedure to the facsimile reception is performed. At step S61, if the originated apparatus is continuing sending next page of the image data via facsimile, the process goes back to step S54.

On the contrary, if the originated apparatus does not send the next page and quits facsimile communication, this process is completed.

Next, the interruption routine of the system controller 1 corresponding to a reception request of data which is requested by the MODEM 5, which is permitted at step S54 and prohibited at step S59 in FIG. 10 will be explained with reference to FIG. 11.

At step S54, the MODEM 5 is permitted to send a interruption signal to an interruption signal input terminal (not shown) in the system controller 1 requesting to the system controller 1 to fetch received data of predetermined bits (e.g., 1 byte) from the MODEM 5. Therefore, at step S62, whenever the data of the predetermined bits is received by the MODEM 5, the interruption request to the interruption signal input terminal of the system controller 1 becomes effective. Accordingly, when the system controller 1 receives the interruption request, it reads the received data of the predetermined bits from the MODEM 5.

At step S63, the received data which is read at step S62 is sequentially stored in the reception buffer area of the transmission/reception buffer 9. Thereafter, whenever there is the interruption request, the processes at step S62 and S63 are performed.

Next, a memory copy operation including a printing operation of received data will be described.

In this process, all image data read by the reader is stored in the memory 15, and later, sequentially printed out by the printing unit 3. This operation differs from a "copying" operation in which image data of a document is printed out as it is read, and in the memory copy operation, a plurality of copies of the image data can be printed cut with a single scanning process. Further, received data is also stored in the memory 15, thus it is possible to print out the received data in the same operation as the memory copy operation which will be explained below. It should be noted that, as for the memory copy operation, a part of the control differs from the one in the printing process of the received data. More specifically, since an operator is usually by the apparatus during the memory copy operation, if image data for copying process is stored in the memory 15, the backup function of the memory 15 is not turned on.

This is because, if the main power supply 15 is shut off during the memory copy operation, the operator may leave the apparatus. Thus, if the image data to be printed out during a memory copy operation is backed up and the main power supply is recovered after a while, there is a possibility that the operator of the copied image data can not be known.

Figure 12:
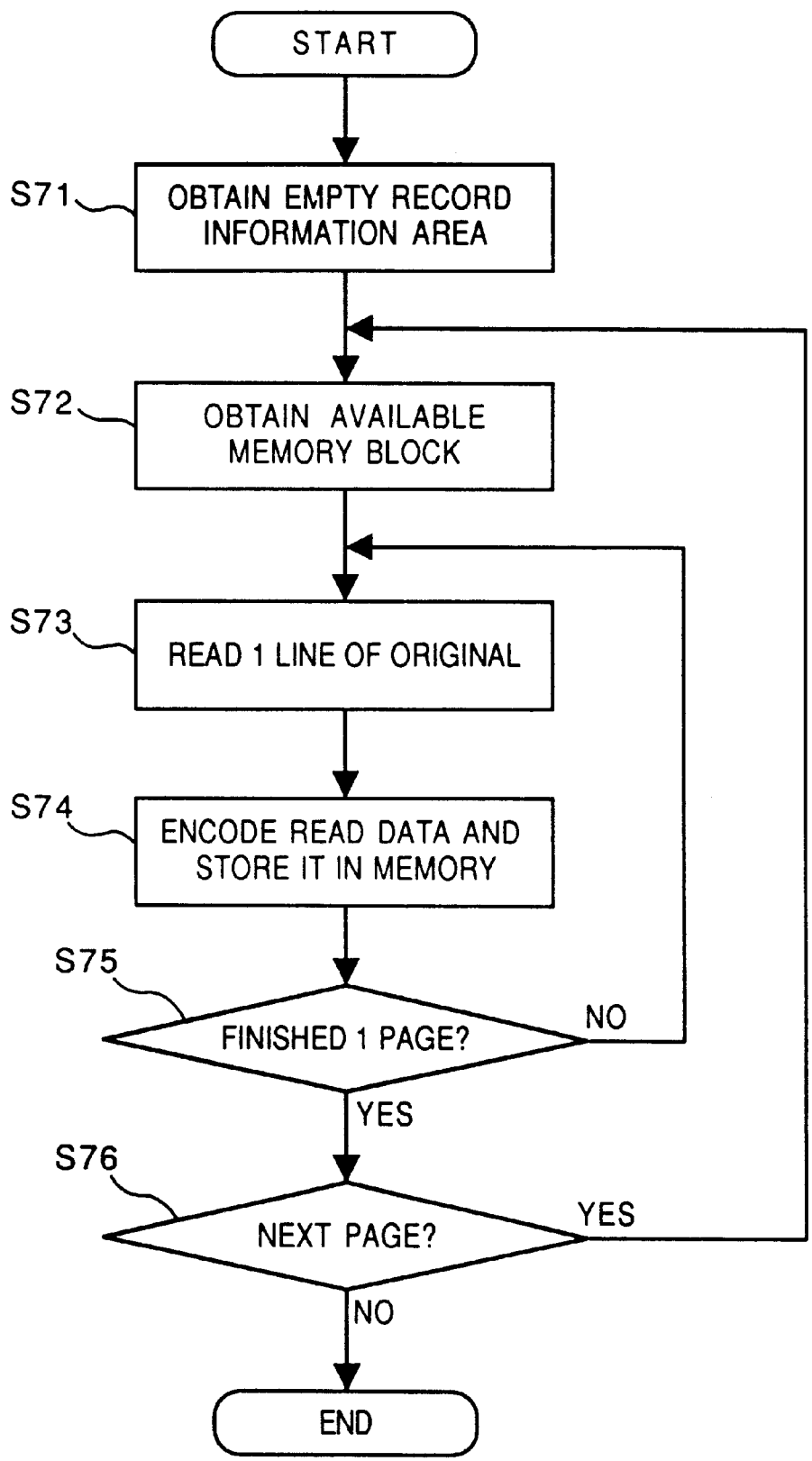
FIG. 12 is a flowchart showing a memory storing process in a memory copy operation of the facsimile apparatus according to the fifth embodiment.
Figure 13:
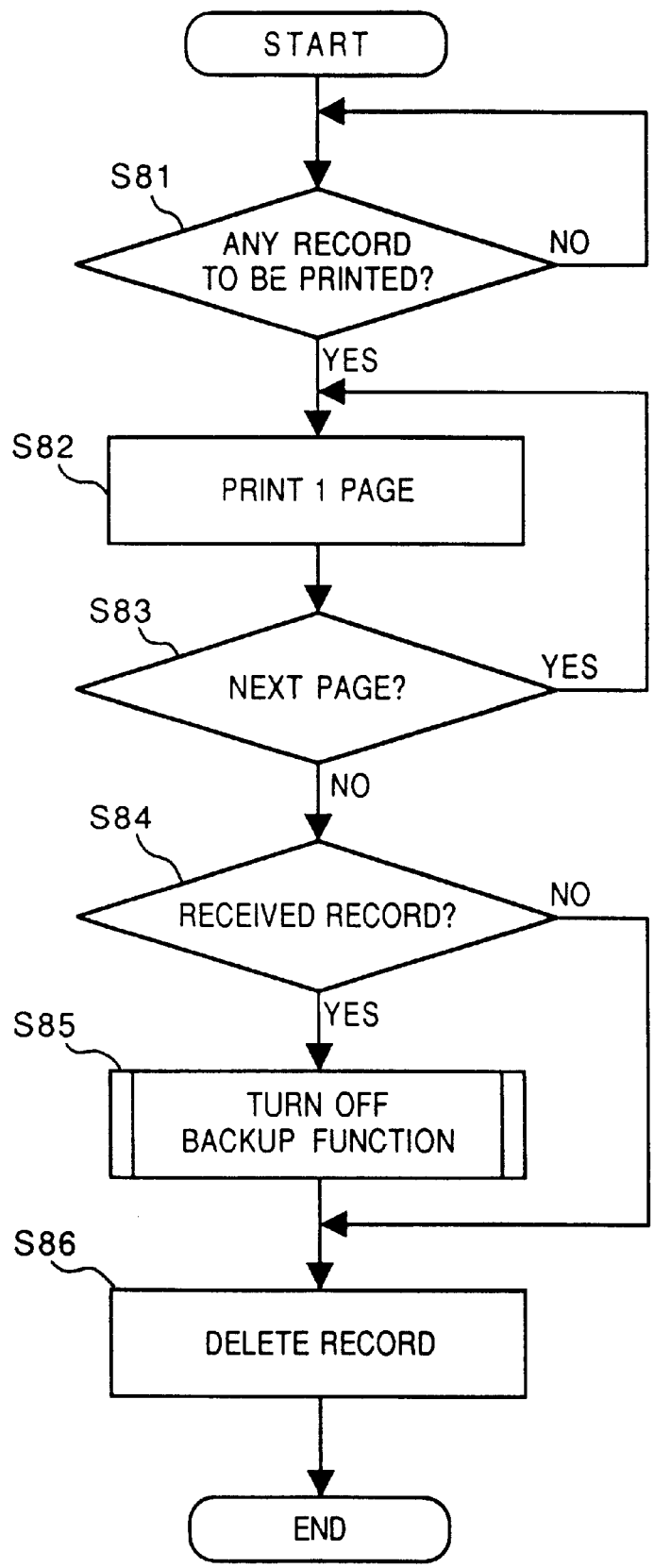
FIG. 13 is a flowchart showing an image printing process which is common between the receiving operation and the memory copy operation in the facsimile apparatus according to the fifth embodiment.

FIGS. 12 and 13 are flowcharts showing a memory copy operation according to the fifth embodiment. FIG. 12 is a flowchart for showing processes between a process of reading an original image and a process of storing the read image data in the memory 15, and FIG. 13 is a flowchart showing a subsequent printing process. The printing process shown in FIG. 13 is processed in the same routine as the one in the receiving operation except a backup process.

First referring to FIG. 12, processes between a process of reading an original image and a process of storing the read image data in the memory 15.

An operator sets the original to be copied in the reader 2, and instructs to start memory copy operation from the operational unit 4. With the instruction, the process starts performing the process shown in FIG. 12, and the system controller 1 searches the record management table in the management memory 8 at step S71 and obtains an empty record information area. Next at step S72, it searches the memory block management table and obtains an available memory block. Then, the memory block number is written in the record information area obtained at step S71.

Next at step S73, the system controller 1 controls the reader 2 to start reading the original set in the reader 2 and the reader 2 read pixel data of a single line from the original, for example. Then, the system controller 1 encodes and compresses the read pixel data which is read at step S73, and stores the compressed pixel data in the memory block which is obtained at step S72.

At step S75, whether or not a page of original image has been read is determined. If it has not, the process returns to step S73.

Whereas if it has, the process proceeds to step S76 where it is determined whether or not there is any more original to be copied. If there is more original, the process returns to step S72.

On the contrary, if it is determined that there is no more original to be copied, a memory storage process of the memory copy operation is completed.

Next, referring to FIG. 13, a printing operation of the image data stored in the memory 15, as described above, will be explained. Note that the process shown in the flowchart in FIG. 13 is performed as parallel processing task in time division manner with other process in the system controller 1.

First, at step S81, by referring the record management table in the management memory 8, it is checked whether or not there is any active record. If there is no active record, the record management table is supervised until any active record is prepared. If any active record is found, whether or not the record is in the state to be printed out (i.e., if the record contains one page of image data) is determined. If the record is ready to be printed out, the process moves to step S82.

At step S82, numbers of the memory block storing the image data are sequentially read from the record information, searched at the previous step S81, which is subject to the printing operation, the image data stored in the memory blocks corresponding to the read memory block numbers is decoded. Then, the decoded image data is sent to the printing unit 3 where the image data is printed out in a known printing process.

Next at step S83, whether or not there is any print information for the next page which is ready to be printed in the record which is printed at step S82 is determined. If there is image data of the next page which is ready to be printed, then the process returns to step S82.

If there is no successive image data which is ready to be printed, the process proceeds to step S84. Note that, if the record which is subject to printing operation is received data and the apparatus is in the middle of receiving image data, the process exceptionally waits at step S83 until the receiving operation is over.

At step S84, whether the record is received image data or image data read by the reader 2 is determined. If the record is the read image data, then the process moves to step S86.

Whereas if the record is the received image data, the process moves to step S85 and the aforesaid subroutine for turning off the backup function shown in FIG. 9 is performed. In addition, a flag indicating that backup is necessary in the record attribution information is reset, then the process moves to step S86.

At step S86, after the image data stored in memory blocks is printed out, the memory blocks are freed by changing management data in the memory block management table in the management memory 8 so as to show that they are available. Further, the registration of the record of the image data which is printed, is deleted from the record management table, and an ending process for initializing the contents of he record is performed.

According to the fifth embodiment as described above, it is possible to apply the aforesaid memory backup control to other electrical apparatus. Therefore, it is possible to realize to perform effective DRAM backup in a facsimile apparatus and to control the facsimile apparatus so as not to backup DRAM when unnecessary, thus effectively preventing a secondary battery from being discharged in vain.

According to each of above embodiments, when the main power supply is shut off, by controlling memory backup to function by using a backup battery only when there is useful data in a memory, it is possible to prevent unnecessary memory backup, thus preventing a backup battery from being discharged in vain. As a result, it is possible to achieve a reliable memory backup.

Further, by preventing unnecessary backup operation, a possibility that a secondary battery is in the fully-charged state can be controlled better.

The present invention can be applied to a system constituted by a plurality of devices, or to an apparatus comprising a single device. Furthermore, the invention is applicable also to a case where the object of the invention is attained by supplying a program to a system or apparatus. Furthermore, the invention is applicable also to a case where the invention is embodied by supplying a program to a system or apparatus. In this case, a storage medium, storing a program according to the invention, constitutes the invention. The system or apparatus installed with the program read from the medium realizes the functions according to the invention.

According to the structures as described above, memory is backed up only wren it is storing data to be maintained, thus following advantages can be obtained.

1. If there is no useful image data in the memory, when a main memory is shut off, a secondary battery which is backup current source does not discharge much current, thus an apparatus having its second battery almost fully charged when it is turned on next time can be obtained.
2. To discharge from the secondary battery for performing memory backup is limited to periods when useful image data is stored in the memory. Thus, it is possible to reduce the number of times to discharge the secondary battery, thereby extending lifetime of the secondary battery.
3. By selectively backing up DRAM chips storing useful image data when a memory is composed of a plurality of DRAM chips, it is possible to maintain data for a long time with the same secondary battery of fixed capacity.

What is claimed is:

1. A memory backup circuit comprising:

a memory for storing data to be processed;

identifying means for identify whether or not useful data is stored in said memory;

a backup battery which is charged while a main power supply is supplying current and discharges current when the main power supply ceases supplying current;

power supply supervising means for changing election from the main power supply and said backup battery as current supply source to said memory; and backup control means for performing a self-refresh control sequence on said memory;

wherein said backup control means executes the self-refresh control sequence only when said power supply supervising means detects a drop of an output voltage from a main power supply and when said identifying means has determined that said memory has useful data.

2. The memory backup circuit according to claim 1, wherein said memory includes a plurality of memory units, said identifying means identifies storage states of useful data by each of said memory units, and said backup control means executes the self-refresh control sequence only on memory unit or units of said plurality of memory units storing the useful data.

3. The memory backup circuit according to claim 2, further comprising useful data rearranging means for rearranging useful data stored in said plurality of memory units so as to be stored in a minimum possible number of memory units.

4. The memory backup circuit according to one of claims 1 to 3, wherein useful data stored in said memory is encoded data.

5. The memory backup circuit according to claim 4, wherein said encoded data is communication data transmitted from another apparatus.

6. The memory backup circuit according to claim 4, wherein the encoded data stored in said memory is image data.

7. A memory backup method for an information processing apparatus having a memory for storing data to be processed and a backup battery which is charged while a main battery is supplying current and which discharges when the main battery does not supply current, said method comprising the steps of:

identifying whether or not said memory is storing useful data; and executing a self-refresh sequence on said memory when a drop of an output voltage of the main power supply is detected and only when it is identified that said memory has useful data.

8. The memory backup method according to claim 7, wherein said memory includes a plurality of memory units, storage states of useful data are identified by each of said memory units, and the self-refresh control sequence is selectively executed only on a memory unit or units of said plurality of memory units storing the useful data.

9. The memory backup method according to claim 8, further comprising useful data rearranging step of rearranging useful data stored in said plurality of memory units so as to be stored in a minimum possible number of memory units.

10. The memory backup method according to one of claims 7 to 9, wherein useful data stored in said memory is encoded data.

11. The memory backup method according to claim 10, wherein said encoded data is communication data transmitted from another apparatus.

12. The memory backup method according to claim 10, wherein the encoded data stored in said memory is image data.

13. The memory backup circuit according to claim 5, wherein the encoded data stored in said memory is image data.

14. The memory backup circuit according to claim 11, wherein the encoded data stored in said memory is image data.

* * * * *

UNITED STATES PATENT AND TRADEMARK OFFICE
CERTIFICATE OF CORRECTION

PATENT NO.  : 5,930,192                       Page 1 of 5

DATED       : July 27, 1999

INVENTOR(S) : YUJI ISHIKAWA

It is certified that error appears in the above-identified patent and that said Letters Patent is hereby corrected as shown below:

ON THE TITLE PAGE

[57] ABSTRACT:

Line 1, "change over" should read --change-over--.

COLUMN 1

Line 20, "send" should read --sent--;
  Line 21, "while" should read --during a--;
  Line 33, "to" should read --to provide--; and
  Line 34, "as" should be deleted.

COLUMN 2

Line 1,  "identify" should read --identifying--; and
  Line 29, "identify" should read --identifying--.

COLUMN 3

Line 40, "embodiment" should read --embodiments--; and
  Line 64, "ir" should read --in--.

UNITED STATES PATENT AND TRADEMARK OFFICE
CERTIFICATE OF CORRECTION

PATENT NO. : 5,930,192

DATED : July 27, 1999

INVENTOR(S) : YUJI ISHIKAWA

It is certified that error appears in the above-identified patent and that said Letters Patent is hereby corrected as shown below:

COLUMN 4

Line 5, "the" should read --at the--; and
Line 41, "I2" should read --$I_2$--.

COLUMN 5

Line 13, "example for" should read --example will be given of--;
Line 22, "aimed" should read --intended--; and
Line 39, "remained" should read --remaining--.

COLUMN 6

Line 27, "as" should read --to as--;
Line 31, "discharge," should read --discharged--; and
Line 56, "above-configuration" should read --above-described configuration--.

UNITED STATES PATENT AND TRADEMARK OFFICE
CERTIFICATE OF CORRECTION

PATENT NO. : 5,930,192

DATED : July 27, 1999

INVENTOR(S) : YUJI ISHIKAWA

It is certified that error appears in the above-identified patent and that said Letters Patent is hereby corrected as shown below:

COLUMN 7

Line 28, "means" should read --indicate--; and
          "is" should read --are--; and
   Line 33, "follow." should read --follows.--.

COLUMN 8

Line 3, "part" should read --parts--;
   Line 6, "are controlled to perform" should read
          --during the--;
   Line 17, "baking" should read --backing--; and
   Line 45, "entire" should read --the entire--.

COLUMN 9

Line 8, "by" should read --to by--;
   Line 32, "input ing" should read --inputting--;
   Line 42, "nor-volatile" should read --non-volatile--;
   Line 60, "these" should read --these kinds of--; and
   Line 63, "storing" should read --storing of--.

UNITED STATES PATENT AND TRADEMARK OFFICE
CERTIFICATE OF CORRECTION

PATENT NO. : 5,930,192

DATED : July 27, 1999

INVENTOR(S) : YUJI ISHIKAWA

It is certified that error appears in the above-identified patent and that said Letters Patent is hereby corrected as shown below:

COLUMN 10

Line 6, "communicate" should read --communicating--; and
Line 52, "has" should read --has the--.

COLUMN 11

Line 18, "destination" should read --destinations--; and
Line 23, "Empty" should read --empty--.

COLUMN 13

Line 24, "originated" should read --source--;
Line 32, "a" should read --an--; and
Line 55, "cut" should read --out--.

COLUMN 14

Line 13, "12" should read --12, there will be described--; and
Line 47, "process" should read --processes--.

UNITED STATES PATENT AND TRADEMARK OFFICE
CERTIFICATE OF CORRECTION

PATENT NO. : 5,930,192            Page 5 of 5

DATED       : July 27, 1999

INVENTOR(S) : YUJI ISHIKAWA

It is certified that error appears in the above-identified patent and that said Letters Patent is hereby corrected as shown below:

<u>COLUMN 16</u>

Line 8,   "identify" should read --identifying--; and
   Line 13, "election" should read --selection--.

Signed and Sealed this

Second Day of May, 2000

Attest:

Attesting Officer

Q. TODD DICKINSON

Director of Patents and Trademarks